US011949973B2

(12) United States Patent
Taki

(10) Patent No.: US 11,949,973 B2
(45) Date of Patent: Apr. 2, 2024

(54) ATTACHMENT OPTICAL SYSTEM, OPTICAL SYSTEM, IMAGE PICKUP APPARATUS, IMAGE PICKUP SYSTEM, AND MANUFACTURING METHOD OF OPTICAL SYSTEM

(71) Applicant: CANON KABUSHIKI KAISHA, Tokyo (JP)

(72) Inventor: Yoshiyuki Taki, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 17/884,783

(22) Filed: Aug. 10, 2022

(65) Prior Publication Data

US 2023/0072113 A1     Mar. 9, 2023

(30) Foreign Application Priority Data

Aug. 18, 2021    (JP) .................................. 2021-133339

(51) Int. Cl.
  *H04N 23/55*     (2023.01)
  *H04N 23/51*     (2023.01)
(52) U.S. Cl.
  CPC ............. *H04N 23/55* (2023.01); *H04N 23/51* (2023.01)

(58) Field of Classification Search
  CPC .... H04N 23/55; H04N 23/51; G02B 15/1465; G02B 15/14514; G02B 15/02
  USPC .......................................................... 348/340
  See application file for complete search history.

(56) References Cited

U.S. PATENT DOCUMENTS

2018/0217367 A1*  8/2018  Byler .................. G02B 15/142

FOREIGN PATENT DOCUMENTS

JP         2017026773 A        2/2017

* cited by examiner

*Primary Examiner* — Joel W Fosselman
(74) *Attorney, Agent, or Firm* — ROSSI, KIMMS & McDOWELL LLP

(57) ABSTRACT

An attachment optical system attachable to and detachable from an imaging optical system includes a first converter optical system attachable to an object side of the imaging optical system, and a second converter optical system attachable to an image side of the imaging optical system. The first converter optical system includes a first unit consisting of a dome-shaped cover. A predetermined condition is satisfied.

12 Claims, 10 Drawing Sheets

ATTACHMENT OPTICAL SYSTEM, OPTICAL SYSTEM, IMAGE PICKUP APPARATUS, IMAGE PICKUP SYSTEM, AND MANUFACTURING METHOD OF OPTICAL SYSTEM

BACKGROUND

Technical Field

The disclosure relates to an attachment optical system, which is suitable for a digital video camera, a digital still camera, a broadcasting camera, a film-based camera, a surveillance camera, and the like.

Description of the Related Art

In a case where an imaging optical system designed for use in air is used in water, optical performance deteriorates because a refraction action at an interface between water and the imaging optical system changes and aberration changes. Japanese Patent Laid-Open No. ("JP") 2017-26773 discloses an attachment optical system attachable to an object side of an imaging lens and configured to satisfactorily correct various aberrations in water.

However, it is difficult for the attachment optical system disclosed in JP 2017-26773 to handle all aberrational changes. In order to reduce all aberrational changes, it is necessary to attach a converter lens to a space between the imaging lens and an image plane. In a case where the refractive power of the converter lens is set strong so as to correct aberrations, a focusing amount caused by the movement of the focus lens in the imaging lens for use in air and that for use in water are significantly different from each other and performance during autofocus (AF) deteriorates.

SUMMARY

The disclosure provides an attachment optical system, an optical system, an image pickup apparatus, an image pickup system, and a method for manufacturing an optical system, each of which can provide optical performance for use in water close to that for use in air.

An attachment optical system according to one aspect of the disclosure attachable to and detachable from an imaging optical system includes a first converter optical system attachable to an object side of the imaging optical system, and a second converter optical system attachable to an image side of the imaging optical system. The first converter optical system includes a first unit consisting of a dome-shaped cover. The following conditional inequality is satisfied:

$$0.9 << |skcw/skmw| < 1.5$$

where skcw is a distance on an optical axis from a lens surface closest to an image plane of the imaging optical system to the image plane while the attachment optical system is attached to the imaging optical system in water, and skmw is a distance on the optical axis from the lens surface closest to the image plane of the imaging optical system to the image plane while the attachment optical system is not attached to the imaging optical system in air. The optical system according to another aspect of the disclosure includes an imaging optical system, and the above attachment optical system. An image pickup apparatus having the above optical system also constitutes another aspect of the disclosure.

A method according to another aspect of the disclosure for manufacturing an optical system that includes an imaging optical system, and an attachment optical system attachable to and detachable from the imaging optical system includes the steps of attaching a plurality of lenses included in a first converter optical system constituting the attachment optical system to an object side of the imaging optical system, attaching a second converter optical system constituting the attachment optical system to an image side of the imaging optical system, and attaching a dome-shaped cover included in the first converter optical system to the object side of the imaging optical system. The following conditional inequality is satisfied:

$$0.9 << |skcw/skmw| < 1.5$$

where skcw is a distance on an optical axis from a lens surface closest to an image plane of the imaging optical system to the image plane while the attachment optical system is attached to the imaging optical system in water, and skmw is a distance on the optical axis from the lens surface closest to the image plane of the imaging optical system to the image plane while the attachment optical system is not attached to the imaging optical system in air.

Further features of the disclosure will become apparent from the following description of exemplary embodiments with reference to the attached drawings.

DESCRIPTION OF THE EMBODIMENTS

Figure 1A:
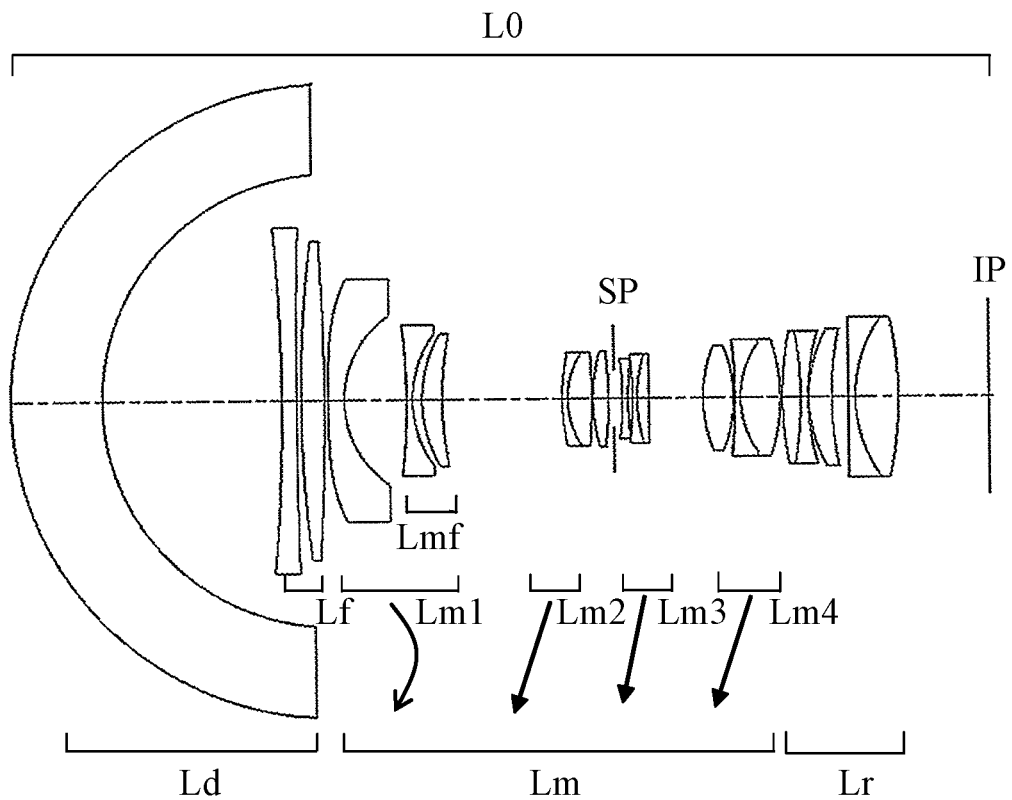
FIGS. 1A, 1B, and 1C are sectional views at a wide-angle end, an intermediate (middle) focal length, and a telephoto end of an optical system according to Example 1 in an in-focus state (on an object) at infinity.

Referring now to the accompanying drawings, a detailed description will be given of embodiments according to the disclosure. Corresponding elements in respective figures will be designated by the same reference numerals, and a duplicate description thereof will be omitted.

Figure 1B:
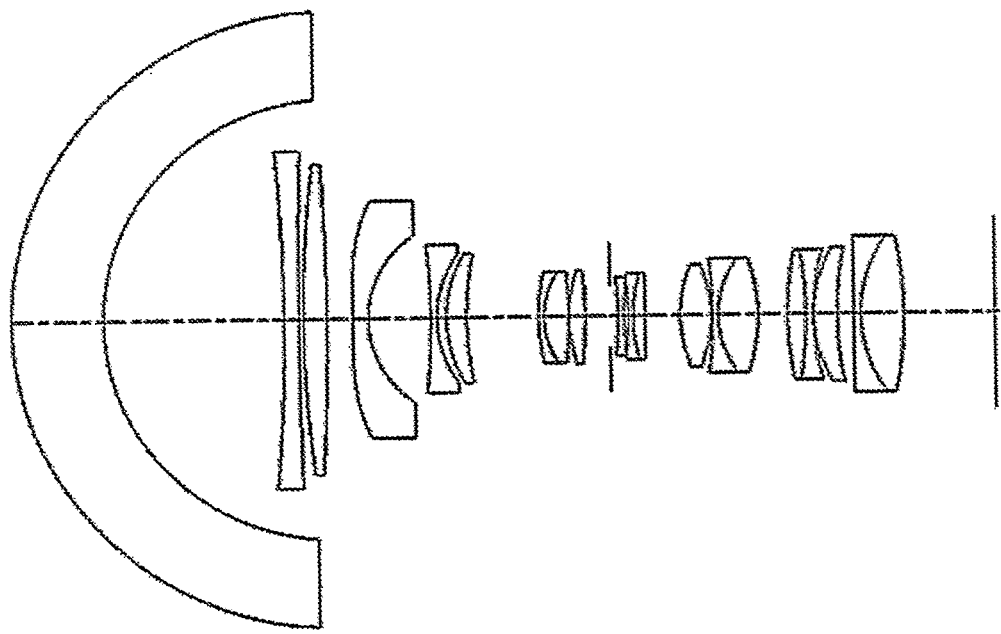
Figure 1C:
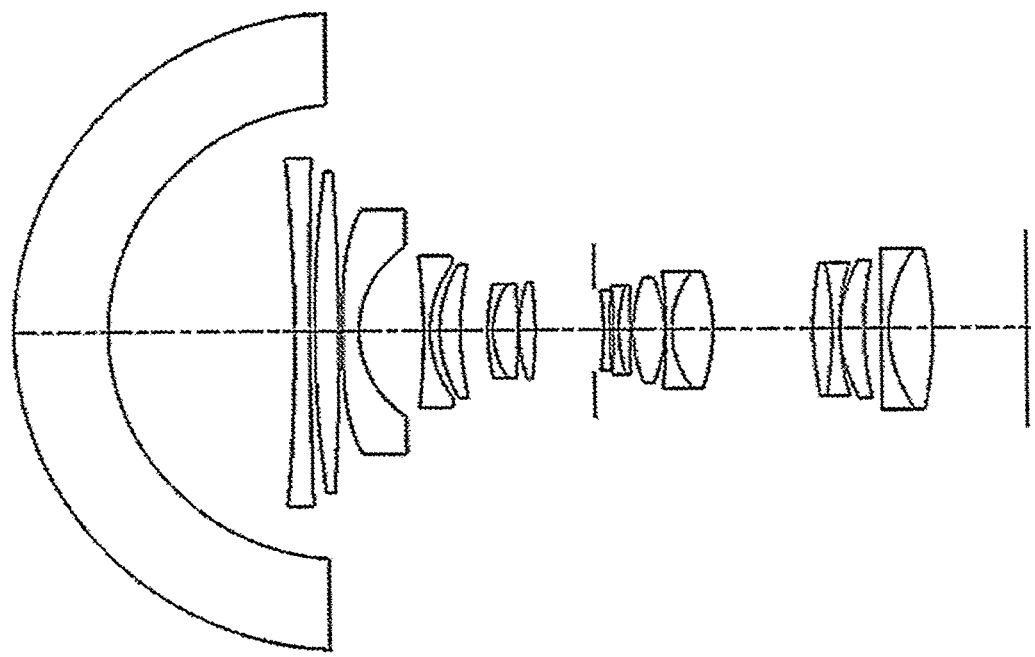
Figure 3A:
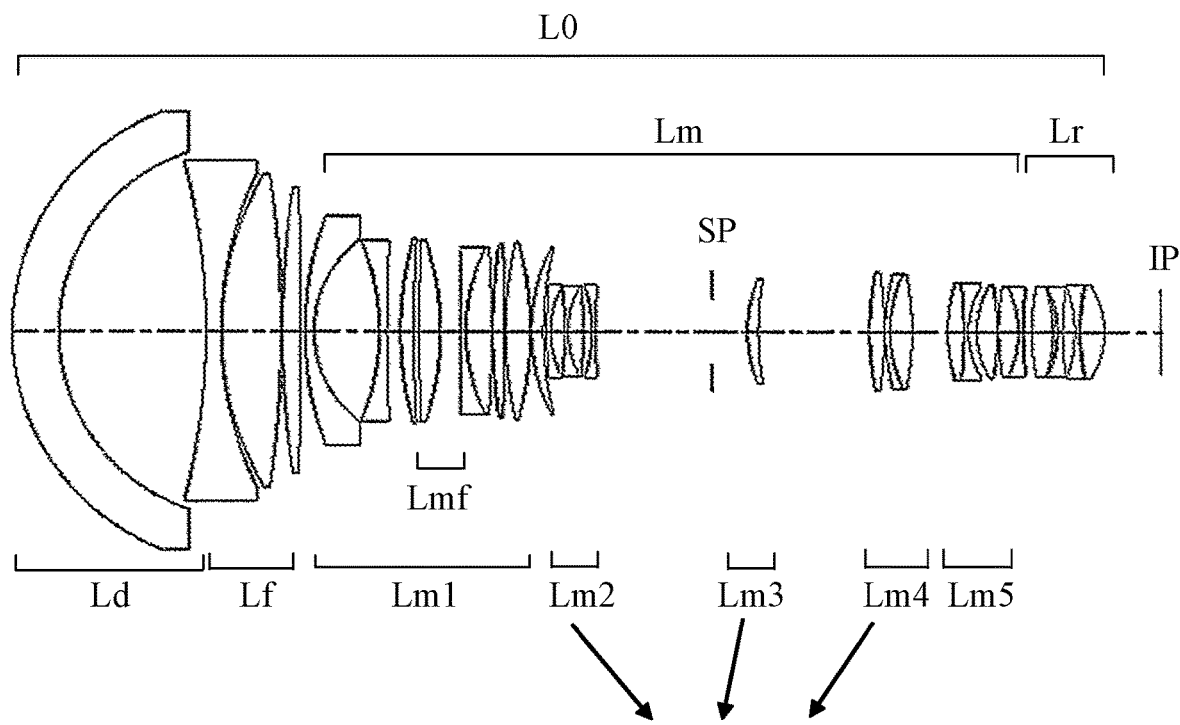
FIGS. 3A, 3B, and 3C are sectional views at a wide-angle end, an intermediate focal length, and a telephoto end of an optical system according to Example 2 in the in-focus state at infinity.
Figure 3B:
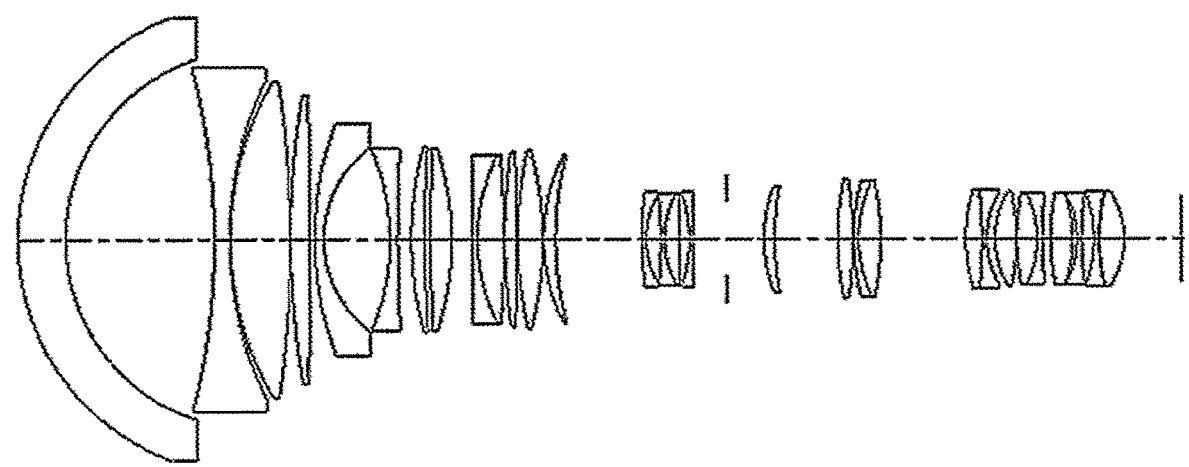
Figure 3C:
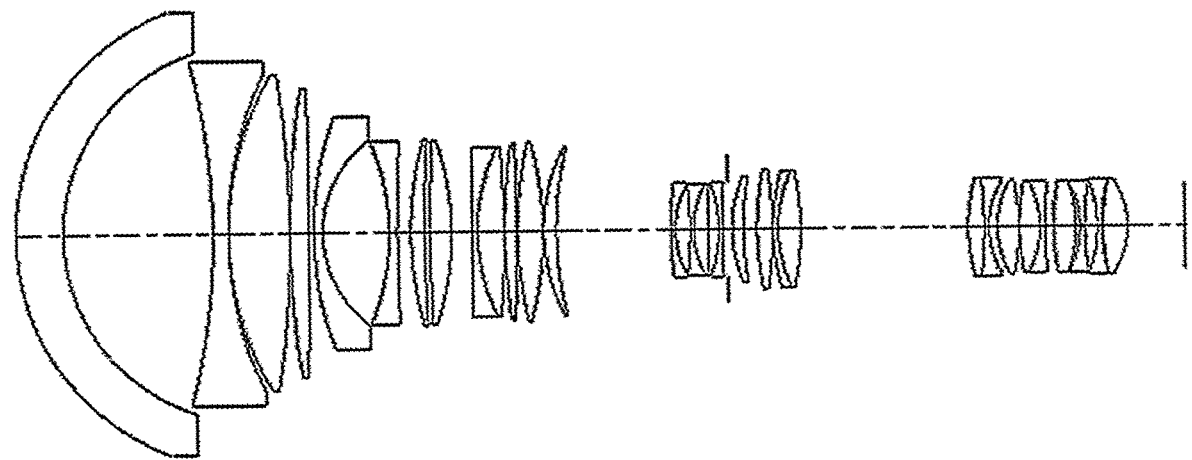
Figure 5A:
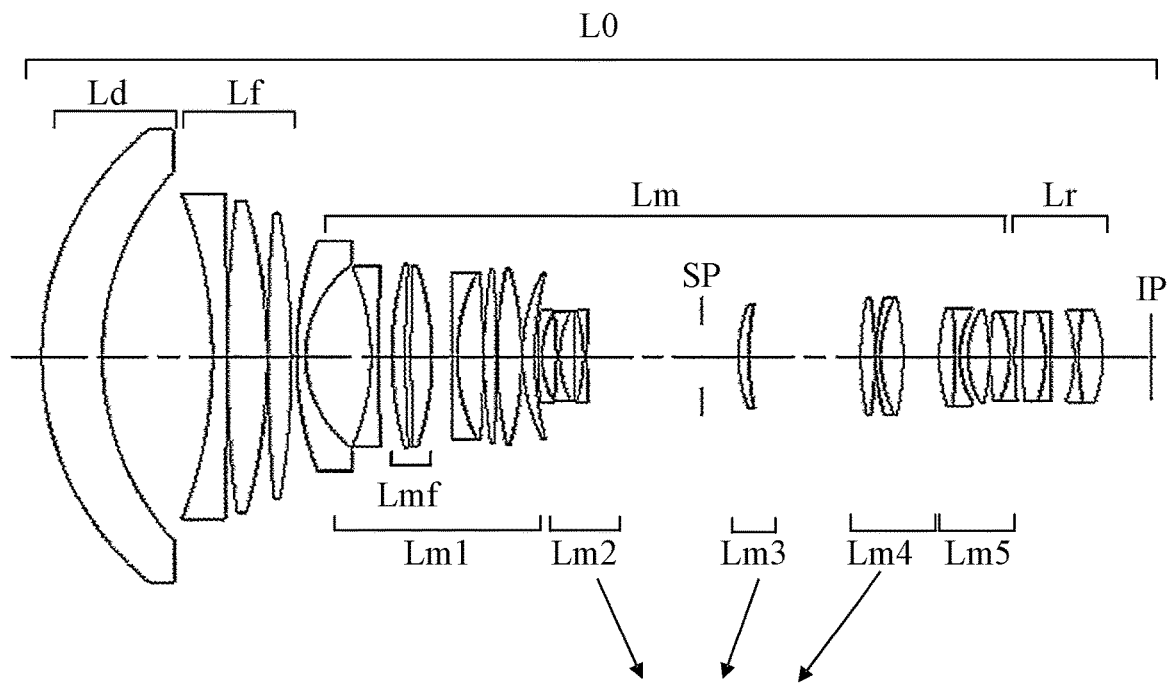
FIGS. 5A, 5B, and 5C are sectional views at the wide-angle end, the intermediate focal length, and the telephoto end of the optical system according to Example 3 in the in-focus state at infinity.
Figure 5B:
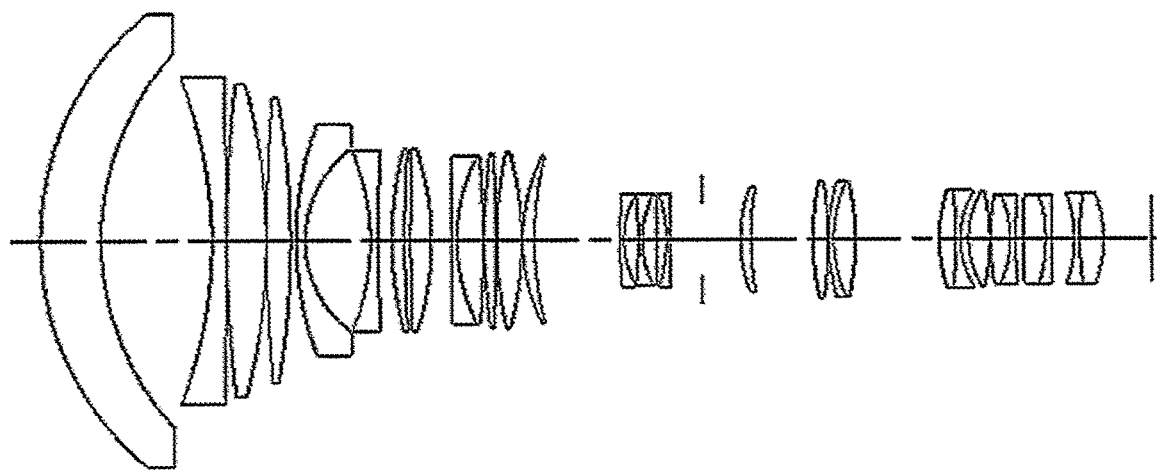
Figure 5C:
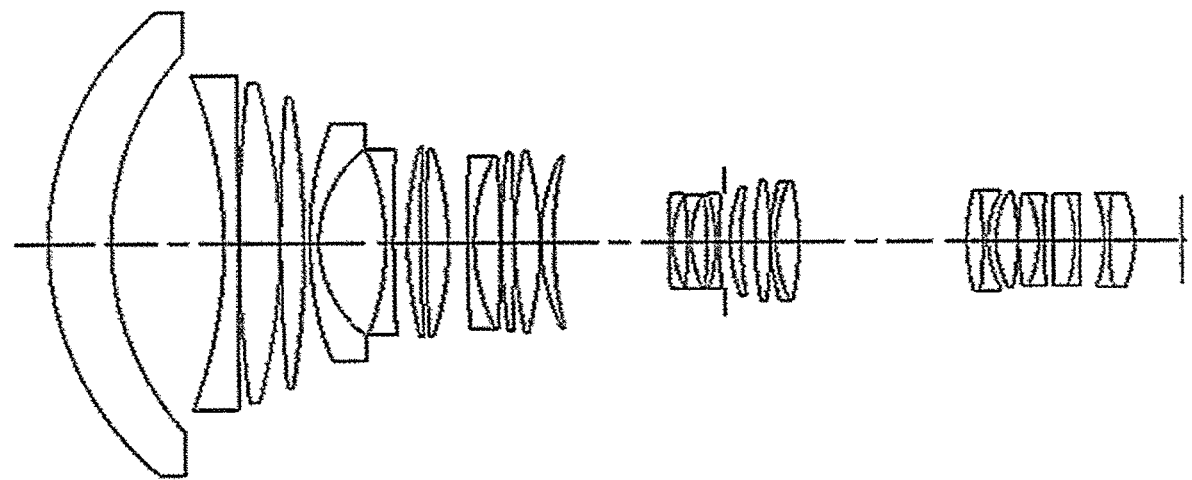

FIGS. 1A, 3A, and 5A are sectional views at a wide-angle end of optical systems L0 according to Examples 1 to 3 in an in-focus state (on an object) at infinity (on an infinity object). FIGS. 1B, 3B, and 5B are sectional views at an intermediate focal length of the optical systems L0 according to Examples 1 to 3 in the in-focus state at infinity, respectively. FIGS. 1C, 3C, and 5C are sectional views at a telephoto end of the optical systems L0 according to Examples 1 to 3 in the in-focus state at infinity. The optical system according to each example is an optical system for an image pickup apparatus such as a digital video camera, a digital still camera, a broadcasting camera, a film-based camera, and a surveillance camera.

In each sectional view, a left side is an object side and a right side is an image side. The optical system L0 according to each example includes a plurality of lens units. In this specification, a lens unit is a group of lenses that move or stand still integrally during zooming. The lens unit may include one or more lenses. The lens unit may include a diaphragm (aperture stop).

The optical system L0 according to each example includes, in order from the object side to the image side, a dome-shaped housing (first unit) Ld, a front converter lens (second unit) Lf, an imaging optical system Lm, and a rear converter lens Lr. The dome-shaped housing Ld is a dome-shaped cover and is used adjacent to a medium such as water. In this example, the outside of the dome-shaped housing Ld is in water and the inside is in air. The imaging optical system Lm is designed to have optimum performance in air. The front converter lens Lf includes a plurality of lenses. The attachment optical system according to each example is attachable to and detachable from the imaging optical system Lm, and includes a first converter optical system attachable to the object side of the imaging optical system Lm, and a second converter optical system attachable to the image side of the imaging optical system Lm. The first converter optical system includes a dome-shaped housing Ld and a front converter lens Lf. The second converter optical system includes a rear converter lens Lr.

In manufacturing the optical system L0 according to each example, first, the plurality of lenses (front converter lens Lf) included in the first converter optical system constituting the attachment optical system are attached to the object side of the imaging optical system Lm. Next, the second converter optical system constituting the attachment optical system is attached. Finally, the dome-shaped housing Ld included in the first converter optical system is attached. The optical system L0 according to each example is manufactured by this method.

In each sectional view, Lmi denotes an i-th lens unit (where i is a natural number) counted from the object side among the lens units included in the imaging optical system Lm.

SP denotes the diaphragm (aperture stop). IP denotes the image plane, and when the optical system L0 according to each example is used as an imaging optical system for a digital still camera or a digital video camera, an imaging plane of a solid-state image sensor (photoelectric conversion element) such as a CCD sensor or a CMOS sensor is placed on the image plane SP. When the optical system L0 according to each example is used as an imaging optical system of a film-based camera, a photosensitive plane corresponding to a film plane is placed on the image plane IP.

The optical system L0 according to each example is configured to move at least one lens unit in the imaging optical system Lm during focusing. In the imaging optical system Lm, the lens unit that is moved during focusing will also be referred to as a focus lens unit Lmf. An arrow illustrated in each sectional view indicates a moving direction of the lens unit during zooming from the wide-angle end to the telephoto end.

Figure 2A:
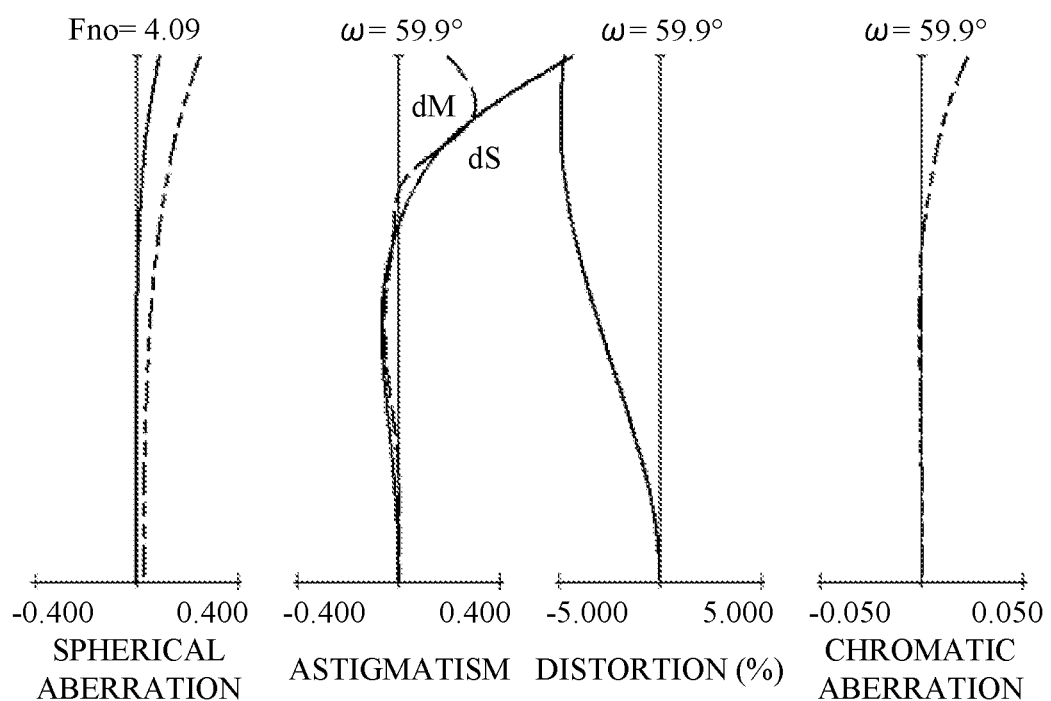
FIGS. 2A, 2B, and 2C are aberration diagrams at the wide-angle end, the intermediate focal length, and the telephoto end of the optical system according to Example 1 in the in-focus state at infinity.
Figure 2B:
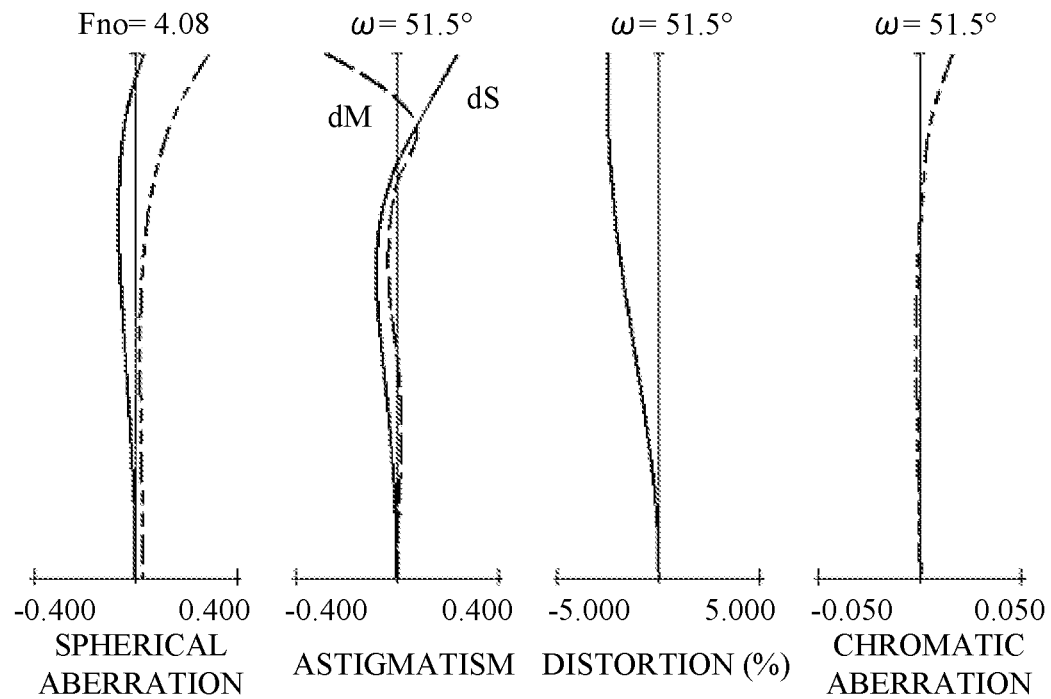
Figure 2C:
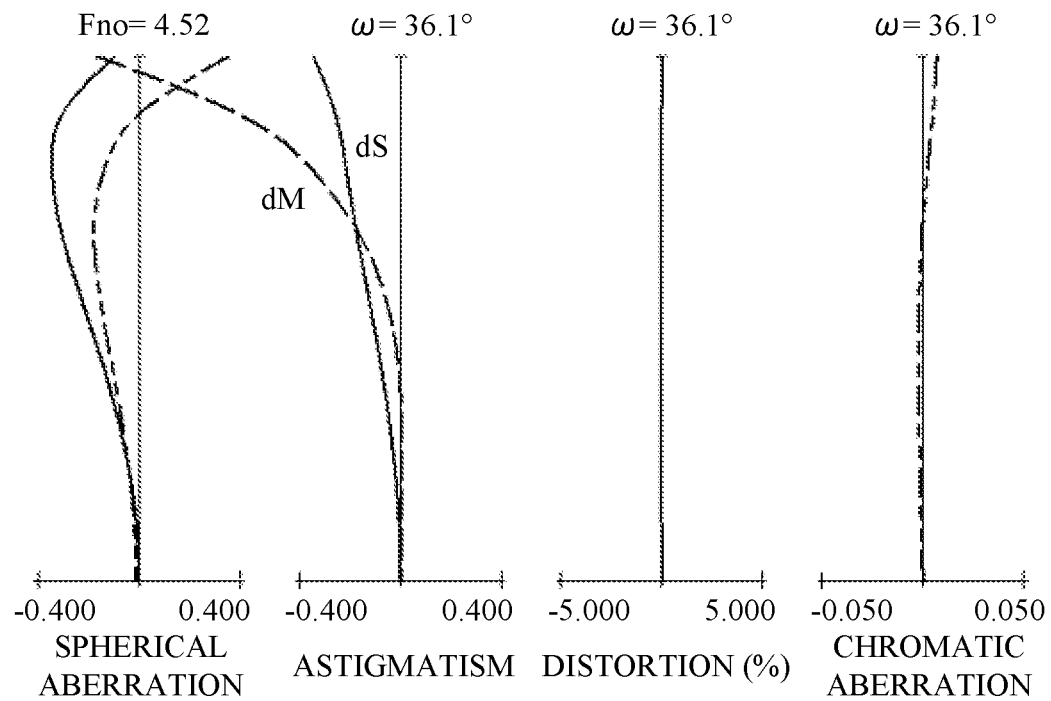
Figure 4A:
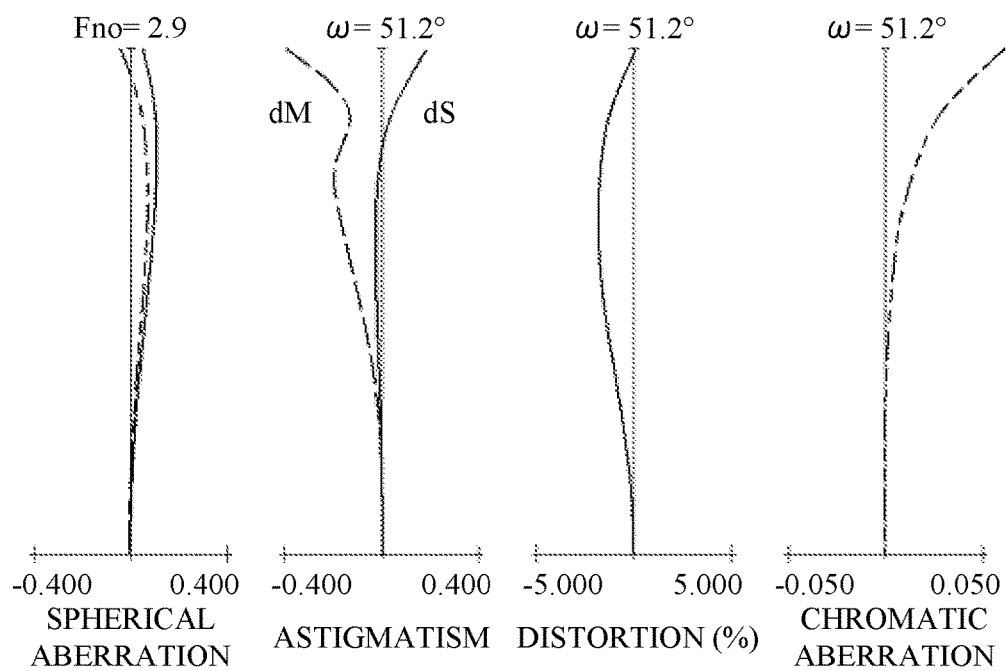
FIGS. 4A, 4B, and 4C are aberration diagrams at the wide-angle end, the intermediate focal length, and the telephoto end of the optical system according to Example 2 in the in-focus state at infinity.
Figure 4B:
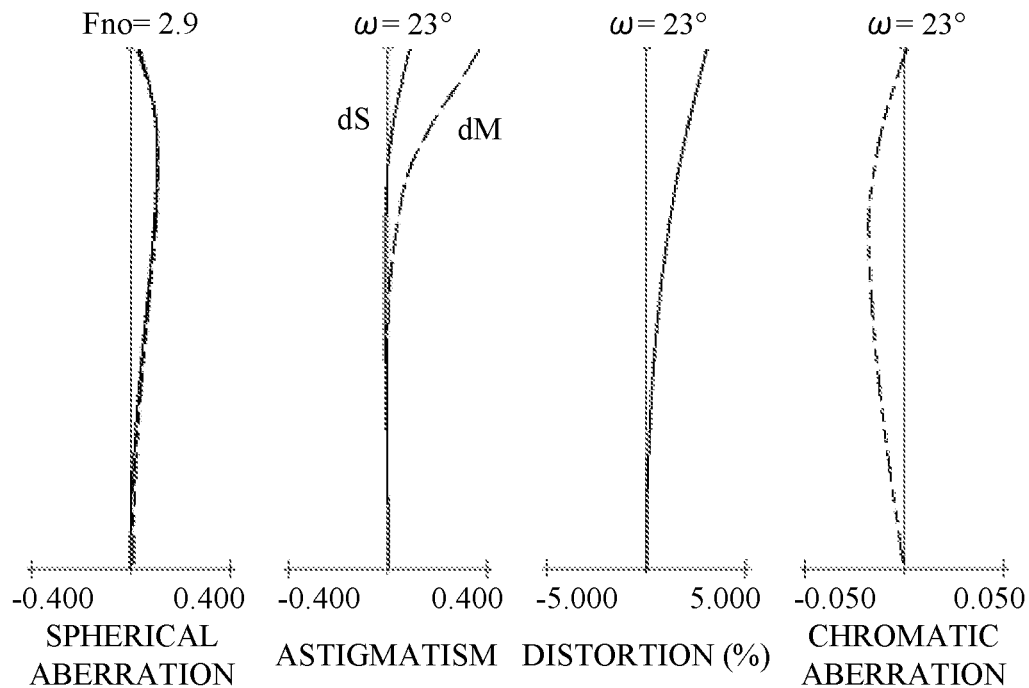
Figure 4C:
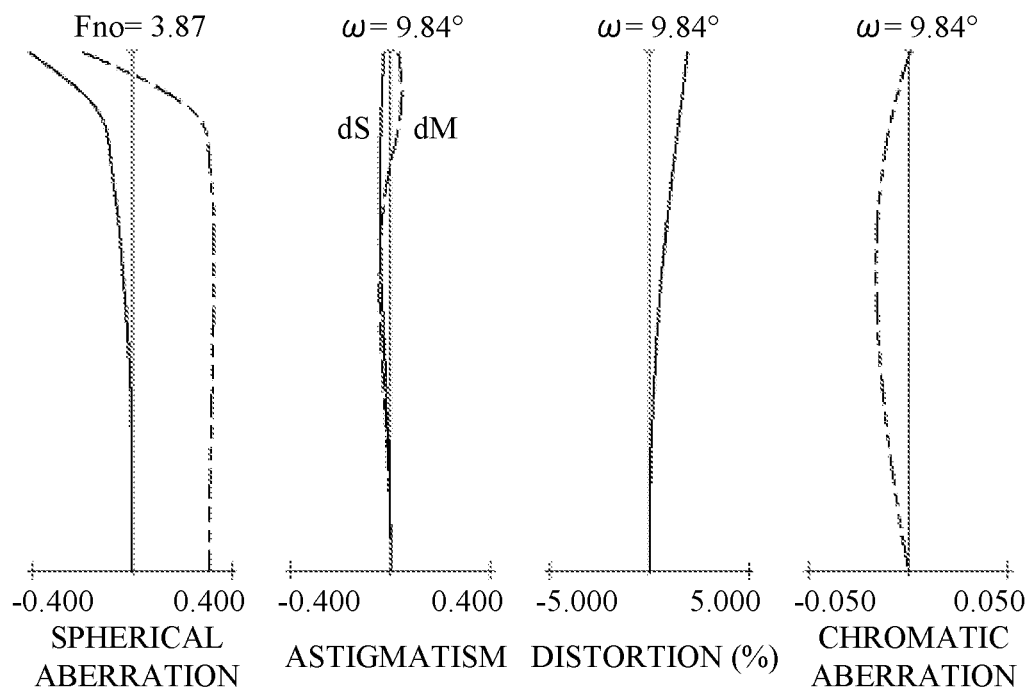
Figure 6A:
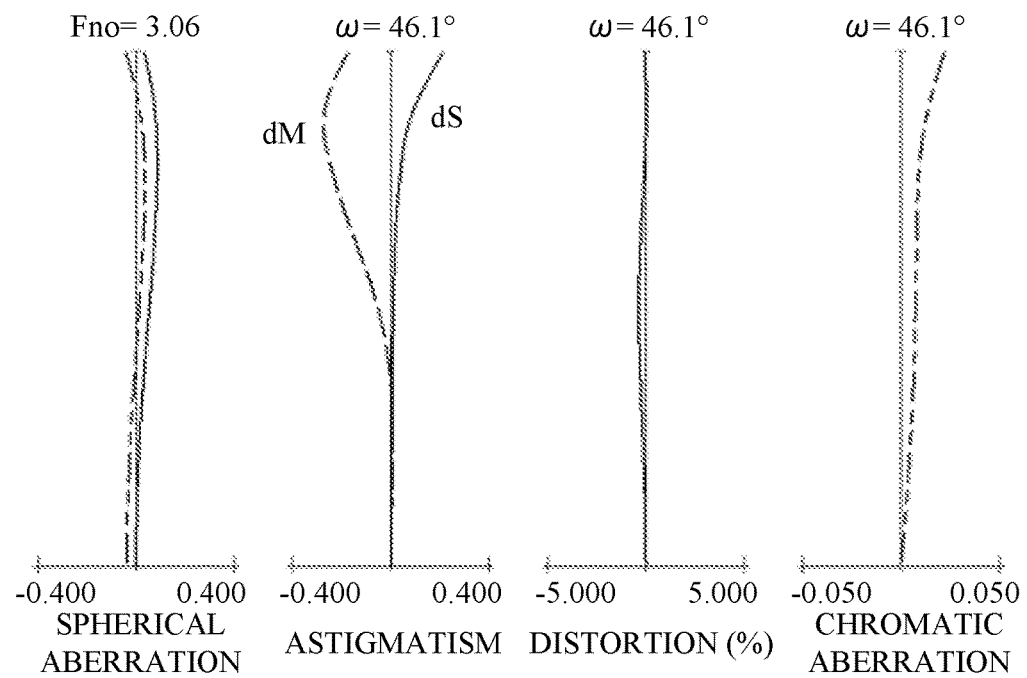
FIGS. 6A, 6B, and 6C are aberration diagrams at the wide-angle end, the intermediate focal length, and the telephoto end of the optical system according to Example 3 in the in-focus state at infinity.
Figure 6B:
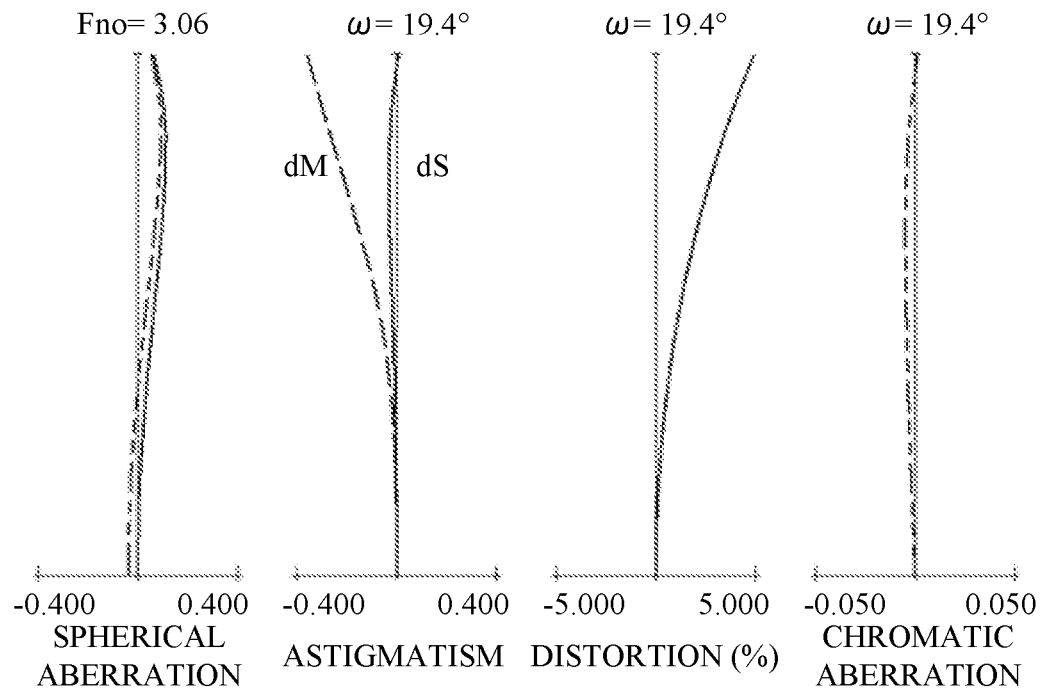
Figure 6C:
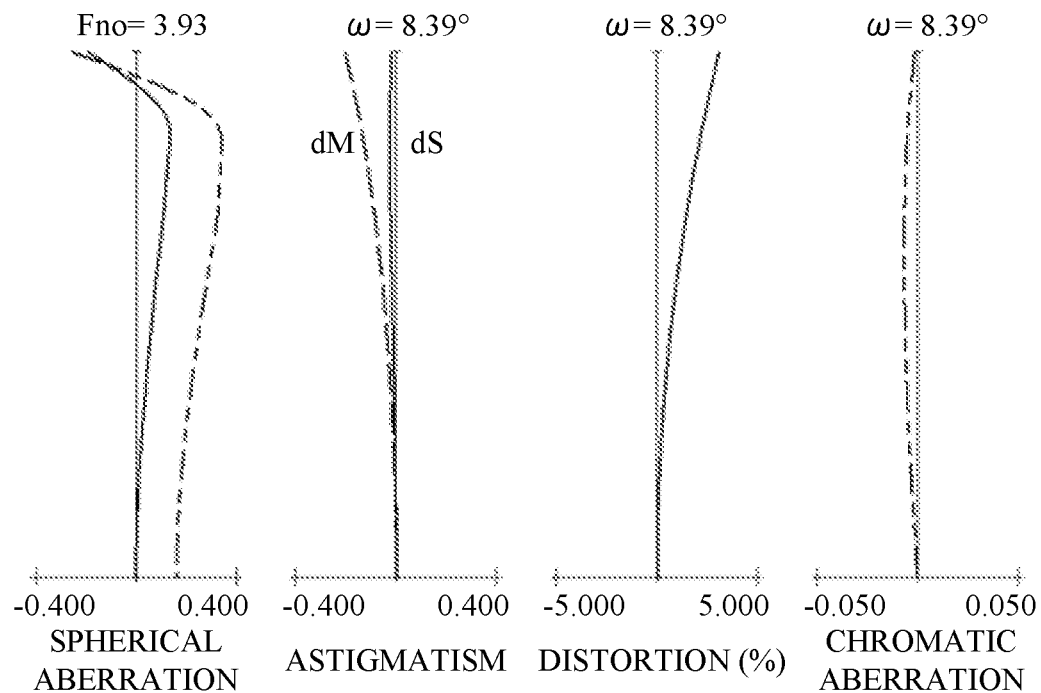

FIGS. 2A, 4A, and 6A are aberration diagrams at the wide-angle end of the optical systems L0 according to Examples 1 to 3 in the in-focus state at infinity, respectively. FIGS. 2B, 4B, and 6B are aberration diagrams at the intermediate focal length of the optical systems L0 according to Examples 1 to 3 in the in-focus state at infinity, respectively. FIGS. 2C, 4C, and 6C are aberration diagrams at the telephoto end of the optical systems L0 according to Examples 1 to 3 in the in-focus state at infinity.

In a spherical aberration diagram, Fno denotes an F-number, and spherical aberration amounts for the d-line (wavelength 587.6 nm) and the g-line (wavelength 435.8 nm) are illustrated. In an astigmatism diagram, dS indicates an astigmatism amount on a sagittal image plane, and dM indicates an astigmatism amount on a meridional image plane. A distortion diagram illustrates a distortion amount for the d-line. A chromatic aberration diagram illustrates a chromatic aberration amount for the g-line. ω is an imaging half angle of view (degrees).

A description will now be given of a characteristic configuration of the optical system L0 according to each example.

In a case where an imaging optical system designed for use in air is housed in a waterproof dome-shaped housing (dome-shaped cover) and used in water, a medium outside the imaging optical system changes from air to water, a refractive index changes, various performance changes occur. More specifically, the following three changes mainly occur. First, a focus position shifts from the image plane in air by the thickness of the dome-shaped housing. Second, since the dome-shaped housing has a negative refractive power, a curvature of field occurs from on-axis to off-axis. Third, since the dome-shaped housing has a negative refractive power, negative distortion occurs. In an attempt to suppress these three changes, new problems arise depending on the solution.

Moving the focus lens unit in the imaging optical system can return the focus position to the image-plane position. However, a focusing amount is reduced, and a short-distance range imageable in air cannot be secured. In addition, aberrations fluctuate as the focus lens is moved.

Attaching the converter optical system to a space between the dome-shaped housing and the imaging optical system can return the focus position to the image-plane position without moving the focus lens unit. However, depending on the focusing amount, the positive refractive power of the converter optical system required for correction becomes high, and positive distortion aberration is significantly generated.

The converter optical system attached between the imaging optical system and the image plane can correct the curvature of field in water to the extent of the curvature of field in air. However, in order to correct the negative distortion caused by the dome-shaped housing, a strong negative refractive power is required toward the periphery of the converter optical system. When the refractive power of the converter optical system is increased, the focusing amounts caused by the movement of the focus lens unit are significantly different between air and water and the performance during AF is deteriorated.

Thus, the attachment optical system is demanded to correct aberrational changes that occur in water in a well-balanced manner, to limit moving of the focus lens unit, and to restrain the refractive power of the so-called rear converter lens disposed on the image plane side of the imaging optical system.

The optical system L0 according to each example satisfies the following inequality (1):

$$0.9 < |skcw/skmw| < 1.5 \quad (1)$$

where skcw is a distance on an optical axis from a lens surface closest to the image plane of the imaging optical system Lm to the image plane while the attachment optical system is attached to the imaging optical system Lm in water, and skmw is a distance on the optical axis from the lens surface closest to the image plane of the imaging optical system Lm to the image plane while the attachment optical system is not attached to the imaging optical system Lm in the air.

The inequality (1) relates to a refractive power of the attachment optical system in water, and defines a relationship between the distance on the optical axis from the lens surface closest to the image plane of the imaging optical system Lm to the image plane while the attachment optical system is attached and that while it is not attached. In a case where a lateral magnification of the rear converter lens Lr becomes higher and the value becomes higher than the upper limit of the inequality (1), the focus sensitivity of the focus lens unit Lmf in water becomes higher than that in air for focus correction, and the performance during AF deteriorates. In a case where the lateral magnification of the rear converter lens Lr becomes lower and the value becomes lower than the lower limit of the inequality (1), the focus sensitivity of the focus lens unit Lmf in water will be smaller than that in air for focus correction, and the performance during AF deteriorates. The focus sensitivity ES is a change in a focus position according to the movement of the focus lens unit Lmf and is expressed by the following expression:

$$ES = (1 - \beta f^2) \times \beta R^2$$

where βf is a lateral magnification of the focus lens unit Lmf, and βR is a combined lateral magnification of all the lenses disposed on the image plane side of the focus lens unit Lmf.

The numerical range of the inequality (1) may be replaced with that of the following inequality (1a):

$$0.9 < |skcw/skmw| < 1.4 \quad (1a)$$

The numerical range of the inequality (1) may be replaced with that of the following inequality (1b):

$$1.00 \leq |skcw/skmw| < 1.35 \quad (1b)$$

Next follows a description of conditions which the optical system L0 according to each example may satisfy. The optical system according to each example may satisfy one or more of the following inequalities (2) to (6):

$$1.5 < |ffc/fn| < 3.0 \quad (2)$$

$$0.1 < |fd/ffc| < 1.0 \quad (3)$$

$$1.0 \leq |ESw/ESa| < 1.2 \quad (4)$$

$$3 < |dd/dfc| < 9 \quad (5)$$

$$0.8 < |ffc/frc| < 1.5 \quad (6)$$

Here, ffc is a focal length of the front converter lens Lf. fn is a focal length of the negative lens included in the front converter lens Lf. fd is a focal length of the dome-shaped housing Ld in water. Esw is a focus sensitivity at the wide-angle end of the imaging optical system Lm while the attachment optical system is attached to the imaging optical system Lm in water. ESa is a focus sensitivity at the wide-angle end of the imaging optical system Lm while the attachment optical system is not attached to the imaging optical system Lm in air. dd is a distance (lens thickness) on the optical axis from the lens surface on the object side of the dome-shaped housing Ld to the lens surface on the image side of the dome-shaped housing Ld. dfc is a distance (lens thickness) on the optical axis from the lens surface on the object side of the concave lens disposed adjacent to the dome-shaped housing Ld of the front converter lens Lf to the lens surface on the image side of the concave lens. frc is a focal length of the rear converter lens Lr.

The inequality (2) defines a proper refractive power distribution of the front converter lens Lf, and defines a relationship between the focal length of the front converter lens Lf and the focal length of the negative lens included in the front converter lens Lf. In a case where the refractive power of the negative lens included in the front converter lens Lf becomes higher and the value becomes higher than the upper limit of the inequality (2), it becomes difficult to correct distortion in water. In a case where the refractive power of the negative lens included in the front converter lens Lf becomes lower and the value becomes lower than the lower limit of the inequality (2), the refractive power of the rear converter lens Lr becomes higher for aberration correction in water and the performance during AF deteriorates due to a change in the focus sensitivity.

The inequality (3) relates to balance between focus-position correction and distortion correction in water and defines a relationship between the focal length of the dome-shaped housing Ld and the focal length of the front converter lens Lf. In a case where the positive refractive power of the front converter lens Lf becomes higher and the value becomes higher than the upper limit of the inequality (3), a moving amount of the focus lens unit Lmf for focus correction is smaller but the distortion increases in the positive direction and it becomes difficult to correct distortion with the rear converter lens Lr. In a case where the positive refractive power of the front converter lens Lf becomes lower and the value becomes lower than the lower limit of the inequality (3), it becomes difficult to correct the focus change associated with zooming on the telephoto end side.

The inequality (4) defines a relationship between the focus sensitivity at the wide-angle end of the imaging optical system Lm while the attachment optical system is attached in water and that while the attachment optical system is not attached in air. In a case where the focus sensitivity changes and the value becomes higher than the upper limit or lower than the lower limit of the inequality (4), the performance during AF deteriorates.

The inequality (5) defines a relationship between a lens thickness of the dome-shaped housing Ld and a lens thickness of the concave lens disposed adjacent to the dome-shaped housing Ld in the front converter lens Lf. In a case where the lens thickness of the dome-shaped housing Ld increases and the value becomes higher than the upper limit of the inequality (5), the attachment optical system becomes larger. In a case where the lens thickness of the dome-shaped housing Ld becomes smaller and the value becomes lower than the lower limit of the inequality (5), it becomes difficult to use the attachment optical system at a deep water depth.

The inequality (6) defines a relationship between the focal length of the front converter lens Lf and the focal length of the rear converter lens Lr. In a case where the refractive power of the rear converter lens Lr becomes higher and the value becomes higher than the upper limit of the inequality (6), the focus sensitivity of the focus lens unit Lmf in water becomes higher than that in air and the performance during AF deteriorates. In a case where the refractive power of the rear converter lens Lr becomes lower and the value becomes lower than the lower limit of the inequality (6), it becomes difficult to correct a curvature of field in water.

The numerical ranges of the inequalities (2) to (6) may be replaced with those of the following inequalities (2a) to (6a).

$$1.5<|ffc/fn|<2.8 \quad (2a)$$

$$0.15<|fd/ffc|<0.90 \quad (3a)$$

$$1.00\leq|ESw/ESa|<1.15 \quad (4a)$$

$$3<|dd/dfc|<8 \quad (5a)$$

$$0.8<|ffc/frc|<1.3 \quad (6a)$$

The numerical ranges of the inequalities (2) to (6) may be replaced with those of the following inequalities (2b) to (6b).

$$1.5<|ffc/fn|<2.6 \quad (2b)$$

$$0.10<|fd/ffc|<0.85 \quad (3b)$$

$$1.00\leq|ESw/ESa|<1.12 \quad (4b)$$

$$3<|dd/dfc|<7 \quad (5b)$$

$$0.8<|ffc/frc|<1.2 \quad (6b)$$

A detailed description will now be given of the optical system L0 according to each example.

In Example 1, the imaging optical system Lm includes, in order from the object side to the image side, a first lens unit Lm1 having a negative refractive power, a second lens unit Lm2 having a positive refractive power, a third lens unit Lm3 having a negative refractive power, and a fourth lens unit Lm4 having a positive refractive power. During focusing from an infinity (infinite) distance to a close distance, the focus lens unit Lmf is moved toward the object side. During zooming from the wide-angle end to the telephoto end, the second lens unit Lm2 and the fourth lens unit Lm4 are moved toward the object side with the same trajectories. The third lens Lm3 is moved toward the object side with a trajectory different from that of each of the second lens unit Lm2 and the fourth lens unit Lm4. The first lens unit Lm1 is moved toward the object side with a trajectory convex toward the image side. The dome-shaped housing Ld, the front converter lens Lf, and the rear converter lens Lr are fixed (immovable) during focusing and zooming.

In Example 2, the imaging optical system Lm includes, in order from the object side to the image side, a first lens unit Lm1 having a positive refractive power, a second lens unit Lm2 having a negative refractive power, a third lens unit Lm3 having a positive refractive power, a fourth lens unit Lm4 having a positive refractive power, and a fifth lens unit Lm5 having a negative refractive power. During focusing from an infinity distance to a close distance, the focus lens unit Lmf is moved to the image side. During zooming from the wide-angle end to the telephoto end, the second lens unit Lm2 is moved to the image side. The third lens Lm3 and the fourth lens unit Lm4 are moved toward the object side with trajectories different from each other. The dome-shaped housing Ld, the front converter lens Lf, and the rear converter lens Lr are fixed during focusing and zooming.

In Example 3, the imaging optical system Lm includes, in order from the object side to the image side, a first lens unit Lm1 having a positive refractive power, a second lens unit Lm2 having a negative refractive power, a third lens unit Lm3 having a positive refractive power, a fourth lens unit Lm4 having a positive refractive power, and a fifth lens unit Lm5 having a negative refractive power. During focusing from an infinity distance to a close distance, the focus lens unit Lmf is moved toward the object side. During zooming from the wide-angle end to the telephoto end, the second lens unit Lm2 is moved to the image side. The third lens Lm3 and the fourth lens unit Lm4 are moved toward the object side with trajectories different from each other. The dome-shaped housing Ld, the front converter lens Lf, and the rear converter lens Lr are fixed during focusing and zooming.

Next follow numerical examples 1 to 3 corresponding to Examples 1 to 3, respectively.

In surface data of each numerical example, r denotes a radius of curvature of each optical surface, and d (mm) denotes an on-axis distance (distance on the optical axis) between an m-th surface and an (m+1)-th surface, where m is a surface number counted from the light incident side. nd denotes a refractive index of each optical member for the d-line, and vd denotes an Abbe number of the optical element. The Abbe number vd of a certain material is calculated as follows:

$$vd=(Nd-1)/(NF-NC)$$

where Nd, NF, and NC are refractive indexes for the d-line (587.6 nm), the F-line (486.1 nm), and the C-line (656.3 nm) in the Fraunhofer line, respectively.

In each numerical example, each of d, focal length (mm), F-number, and half angle of view (degrees) has a value in a case where the optical system L0 according to each example is in-focus on an object at infinity (infinity object). A "back focus" is a distance on the optical axis from the final lens surface (the lens surface closest to the image plane) to a paraxial image plane in terms of air equivalent length. An "overall lens length" is a length obtained by adding the back focus to a distance on the optical axis from the frontmost surface (lens surface on the most object side) to the final surface of the optical system L0.

In a case where the optical surface is aspherical, an asterisk * is attached to the right side of the surface number. The aspherical shape is expressed as follows:

$$X=(h^2/R)/[1+\{1-(1+K)(h/R)^2\}^{1/2}]+A4\times h^4+A6\times h^6+A8\times h^8+A10\times h^{10}+A12\times h^{12}+A14\times h^{14}$$

where X is a displacement amount from a surface vertex in the optical axis direction, h is a height from the optical axis in a direction orthogonal to the optical axis, R is a paraxial radius of curvature, K is a conical constant, A4, A6, A8, A10, A12, and A14 are aspherical coefficients of respective orders. "e±XX" in each aspherical coefficient means "$\times 10^{\pm XX}$."

NUMERICAL EXAMPLE 1
UNIT: mm

Surface Data

| Surface No. | r | d | nd | vd | Effective Diameter |
|---|---|---|---|---|---|
| 1 | 70 | 20 | 1.49171 | 57.4 | 142.9 |
| 2 | 50 | 39.25 | 1 | 0 | 98.2 |

-continued

NUMERICAL EXAMPLE 1
UNIT: mm

| | | | | | |
|---|---|---|---|---|---|
| 3 | −411.377 | 3.2 | 1.85883 | 0 | 75 |
| 4 | 1350.075 | 1 | 1 | 0 | 75 |
| 5 | 271.694 | 5.15 | 1.804 | 46.6 | 69 |
| 6 | −553.775 | (Variable) | 1 | 0 | 69 |
| 7* | 12826.238 | 3.5 | 1.58373 | 59.4 | 52.11 |
| 8 | 22.591 | (Variable) | 1 | 0 | 36.08 |
| 9* | −210.437 | 0.1 | 1.52421 | 51.4 | 31.9 |
| 10 | −146.091 | 1.3 | 1.7725 | 49.6 | 31.83 |
| 11 | 24.773 | 2.09 | 1 | 0 | 27.93 |
| 12 | 28.493 | 4.45 | 1.84666 | 23.9 | 27.83 |
| 13 | 72.575 | (Variable) | 1 | 0 | 26.74 |
| 14 | 45.228 | 1.2 | 1.72825 | 28.5 | 18.5 |
| 15 | 18.666 | 5.35 | 1.51633 | 64.1 | 18.73 |
| 16 | −133.407 | 0.15 | 1 | 0 | 19.39 |
| 17 | 34.369 | 3.49 | 1.67790 | 55.3 | 20.06 |
| 18 | −89.333 | (Variable) | 1 | 0 | 19.99 |
| 19(Diaphragm) | ∞ | 1.87 | 1 | 0 | 16.69 |
| 20 | −66.891 | 1.25 | 1.71999 | 50.2 | 16.35 |
| 21 | 81.615 | 0.93 | 1 | 0 | 16.44 |
| 22 | −88.722 | 1 | 1.62230 | 53.2 | 16.53 |
| 23 | 32.152 | 2.6 | 1.80518 | 25.4 | 17.77 |
| 24 | 2189.196 | (Variable) | 1 | 0 | 18.28 |
| 25 | 29.94 | 6.72 | 1.43875 | 94.9 | 21.51 |
| 26 | −29.94 | 0.15 | 1 | 0 | 22.16 |
| 27* | −622.972 | 0.15 | 1.52421 | 51.4 | 22.19 |
| 28 | −128.586 | 1.2 | 1.834 | 37.2 | 22.21 |
| 29 | 20.96 | 8.71 | 1.48749 | 70.2 | 22.86 |
| 30 | −38.77 | (Variable) | 1 | 0 | 24.58 |
| 31 | 74.435 | 3.98 | 1.80518 | 25.4 | 27 |
| 32 | −85.129 | 1.6 | 1.95375 | 32.3 | 28 |
| 33 | 51.924 | 0.16 | 1 | 0 | 28 |
| 34 | 30.89 | 5 | 1.69895 | 30.1 | 29 |
| 35 | 74.123 | 3.59 | 1 | 0 | 29 |
| 36 | −15977.859 | 1.6 | 1.90525 | 35 | 34 |
| 37 | 30.402 | 9.46 | 1.497 | 81.5 | 34 |
| 38 | −82.954 | (Variable) | 1 | 0 | 34 |
| Image Plane | ∞ | | | | |

Aspheric Data

7th Surface

K = 0.00E+00 A4 = 1.358E−05 A6 = −1.792E−08 A8 = 2.412E−11
A10 = −2.010E−14 A12 = 7.860E−18

9th Surface

K = 0.00E+00 A4 = −9.21E−06 A6 = 2.504E−08 A8 = −1.838E−11
A10 = −6.640E−15

27th Surface

K = 0.00E+00 A4 = −2.20E−05 A6 = −2.588E−08 A8 = −1.363E−11
A10 = 2.925E−13

Various Data
ZOOM RATIO 2.36

| | WIDE-ANGLE | MIDDLE | TELEPHOTO |
|---|---|---|---|
| Focal Length: | 12.56 | 17.22 | 29.7 |
| FNO | 4.09 | 4.08 | 4.52 |
| Half Angle of View (°): | 59.87 | 51.49 | 36.08 |
| Image Height | 21.64 | 21.64 | 21.64 |
| Overall lens length | 214.73 | 214.73 | 214.73 |
| BF | 20 | 20 | 20 |
| d6 | 0.86 | 5.56 | 0.86 |
| d8 | 13.63 | 13.63 | 13.63 |
| d13 | 26.47 | 15.78 | 5.74 |
| d18 | 1.24 | 5.36 | 12.63 |
| d24 | 11.88 | 7.76 | 0.49 |
| d30 | 0.45 | 6.43 | 21.18 |
| d38 | 20 | 20 | 20 |
| Entrance Pupil Position | 82.07 | 84.89 | 82.46 |
| Exit Pupil Position | −56.22 | −51.4 | −50.92 |
| Front Principal Point Position | 96.08 | 102.43 | 106.65 |
| Rear Principal Point Position | 8.15 | 4.48 | −4.25 |

-continued

NUMERICAL EXAMPLE 1
UNIT: mm

Zoom Lens Unit Data

| Lens Unit | Starting Surface | Focal Length: | Lens Configuration Length | Front Principal Point Position | Rear Principal Point Position |
|---|---|---|---|---|---|
| 1 | 1 | −199.55 | 68.6 | 4.21 | −60.33 |
| 2 | 7 | −38.77 | 3.5 | 2.21 | 0 |
| 3 | 9 | −62.01 | 7.94 | −0.11 | −5.32 |
| 4 | 14 | 28.82 | 10.19 | 4.12 | −2.52 |
| 5 | 19 | −46.91 | 7.65 | 2.17 | −3.41 |
| 6 | 25 | 47.74 | 16.93 | 5.12 | −7.27 |
| 7 | 31 | −489.78 | 25.39 | 39.16 | 19.37 |

Single Lens Data

| Lens | Starting Surface | Focal Length: |
|---|---|---|
| 1 | 1 | −137.58 |
| 2 | 3 | −366.82 |
| 3 | 5 | 227.33 |
| 4 | 7 | −38.77 |
| 5 | 9 | 910.93 |
| 6 | 10 | −27.33 |
| 7 | 12 | 52.95 |
| 8 | 14 | −44.49 |
| 9 | 15 | 32.1 |
| 10 | 17 | 37.04 |
| 11 | 20 | −50.88 |
| 12 | 22 | −37.8 |
| 13 | 23 | 40.5 |
| 14 | 25 | 35.33 |
| 15 | 27 | 309.06 |
| 16 | 28 | −21.53 |
| 17 | 29 | 29.31 |
| 18 | 31 | 49.87 |
| 19 | 32 | −33.62 |
| 20 | 34 | 72.33 |
| 21 | 36 | −33.52 |
| 22 | 37 | 46.04 |

NUMERICAL EXAMPLE 2
UNIT: mm

Surface Data

| Surface No. | r | d | nd | vd | Effective Diameter |
|---|---|---|---|---|---|
| 1 | 85 | 17 | 1.49171 | 57.4 | 155.0 |
| 2 | 68 | 53 | 1.00000 | 0.0 | 125.0 |
| 3 | −243.766 | 5.4 | 1.75520 | 27.5 | 120.0 |
| 4 | 133.074 | 0.1 | 1.00000 | 0.0 | 110.0 |
| 5 | 113.222 | 21.56 | 1.75500 | 52.3 | 110.0 |
| 6 | −375.735 | 0.15 | 1.00000 | 0.0 | 110.0 |
| 7 | 311.583 | 6.62 | 2.00272 | 19.3 | 100.0 |
| 8 | −7286.731 | (Variable) | 1.00000 | 0.0 | 100.0 |
| 9* | 134.239 | 3.2 | 1.77250 | 49.6 | 80.5 |
| 10 | 41.501 | 23.47 | 1.00000 | 0.0 | 64.8 |
| 11 | −83.617 | 2.7 | 1.77250 | 49.6 | 63.8 |
| 12 | 595.315 | 4.92 | 1.00000 | 0.0 | 64.0 |
| 13 | 124.54 | 4.85 | 1.89286 | 20.4 | 65.0 |
| 14 | 542.396 | 2.01 | 1.00000 | 0.0 | 64.8 |
| 15 | 891.609 | 7.62 | 1.59522 | 67.7 | 64.3 |
| 16 | −103.942 | 7.03 | 1.00000 | 0.0 | 64.0 |
| 17 | 1089.788 | 2.1 | 1.85478 | 24.8 | 57.7 |
| 18 | 66.895 | 9.54 | 1.49700 | 81.5 | 58.6 |
| 19 | −378.166 | 0.2 | 1.00000 | 0.0 | 59.3 |
| 20 | 210.995 | 4.45 | 1.49700 | 81.5 | 61.1 |
| 21 | −629.084 | 0.2 | 1.00000 | 0.0 | 61.4 |
| 22 | 145.928 | 9.06 | 1.59522 | 67.7 | 62.7 |
| 23 | −119.124 | 0.2 | 1.00000 | 0.0 | 62.7 |
| 24 | 66.144 | 4.45 | 1.76385 | 48.5 | 59.2 |
| 25 | 123.151 | (Variable) | 1.00000 | 0.0 | 58.6 |
| 26* | 214.375 | 1.4 | 1.88300 | 40.8 | 32.4 |

-continued

NUMERICAL EXAMPLE 2
UNIT: mm

| | | | | | |
|---|---|---|---|---|---|
| 27 | 32.32 | 5.32 | 1.00000 | 0.0 | 30.5 |
| 28 | −136.253 | 1.2 | 1.59522 | 67.7 | 30.6 |
| 29 | 34.069 | 5.54 | 1.85478 | 24.8 | 31.5 |
| 30 | −397.458 | 3.46 | 1.00000 | 0.0 | 31.5 |
| 31 | −49.569 | 1.2 | 1.76385 | 48.5 | 31.3 |
| 32 | 281.941 | (Variable) | 1.00000 | 0.0 | 32.3 |
| 33(Diaphragm) | ∞ | (Variable) | 1.00000 | 0.0 | 32.9 |
| 34 | 51.039 | 3.92 | 1.59522 | 67.7 | 36.5 |
| 35* | 139.136 | (Variable) | 1.00000 | 0.0 | 36.5 |
| 36 | 108.64 | 5.45 | 1.49700 | 81.5 | 41.1 |
| 37 | −136.833 | 0.2 | 1.00000 | 0.0 | 41.2 |
| 38 | 79.21 | 1.66 | 2.00100 | 29.1 | 40.8 |
| 39 | 46.824 | 8.11 | 1.49700 | 81.5 | 39.7 |
| 40 | −99.285 | (Variable) | 1.00000 | 0.0 | 39.5 |
| 41 | 60.126 | 5.87 | 1.95906 | 17.5 | 34.3 |
| 42 | −166.195 | 1.66 | 2.00069 | 25.5 | 33.4 |
| 43 | 33.049 | 2.95 | 1.00000 | 0.0 | 31.2 |
| 44 | 33.456 | 7.69 | 1.48749 | 70.2 | 32.5 |
| 45 | −77.237 | 0.2 | 1.00000 | 0.0 | 32.3 |
| 46 | 92.545 | 7.28 | 1.49700 | 81.5 | 31.0 |
| 47 | −36.721 | 1.87 | 1.95375 | 32.3 | 30.0 |
| 48 | 189.601 | (Variable) | 1.00000 | 0.0 | 29.7 |
| 49 | 82.447 | 8 | 1.86966 | 20.0 | 32.0 |
| 50 | −44.069 | 1.37 | 1.00000 | 0.0 | 32.0 |
| 51 | −34.15 | 1.8 | 1.95375 | 32.3 | 32.0 |
| 52 | 98.831 | 4.49 | 1.00000 | 0.0 | 32.0 |
| 53 | −48.402 | 1.66 | 1.94594 | 18.0 | 32.0 |
| 54 | 73.405 | 0.43 | 1.00000 | 0.0 | 33.0 |
| 55 | 66.411 | 8.9 | 1.76200 | 40.1 | 33.0 |
| 56 | −30.513 | (Variable) | 1.00000 | 0.0 | 33.0 |
| Image Plane | ∞ | | | | |

Aspheric Data

9th Surface

K = 3.486510E+00 A4 = 1.591390E−07 A6 = 1.903320E−11 A8 = 4.470850E−14

26th Surface

K = 0.000000E+00 A4 = 3.242710E−07 A6 = −2.922960E−11 A8 = −8.997300E−13

35th Surface

K = 0.000000E+00 A4 = 3.140850E−06 A6 = 1.305900E−10 A8 = −2.000800E−13

Various Data
ZOOM RATIO 7.19

| | WIDE-ANGLE | MIDDLE | TELEPHOTO |
|---|---|---|---|
| Focal Length: | 12.48 | 36.58 | 89.69 |
| FNO | 2.90 | 2.90 | 3.87 |
| Half Angle of View (°): | 51.25 | 23.03 | 9.84 |
| Image Height | 15.55 | 15.55 | 15.55 |
| Overall lens length | 416.2 | 416.2 | 416.2 |
| BF | 20.64 | 20.64 | 20.64 |
| d8 | 2.00 | 2.00 | 2.00 |
| d25 | 1.17 | 31.16 | 41.24 |
| d32 | 41.84 | 11.85 | 1.77 |
| d33 | 13.02 | 13.42 | 1.89 |
| d35 | 40.21 | 22.33 | 4.82 |
| d40 | 12.85 | 30.34 | 59.38 |
| d48 | 3.00 | 3.00 | 3.00 |
| d56 | 20.64 | 20.64 | 20.64 |
| Entrance Pupil Position | 120.66 | 135.46 | 141.71 |
| Exit Pupil Position | −707.14 | −223.36 | −140.28 |
| Front Principal Point Position | 137.03 | 176.98 | 196.45 |
| Rear Principal Point Position | 8.23 | −15.21 | −64.66 |

Zoom Lens Unit Data

| Lens Unit | Starting Surface | Focal Length: | Lens Configuration Length | Front Principal Point Position | Rear Principal Point Position |
|---|---|---|---|---|---|
| 1 | 1 | −2471.52 | 103.83 | −829.89 | −952.03 |
| 2 | 9 | 53.02 | 86 | 58.93 | 39.16 |
| 3 | 26 | −25.25 | 18.12 | 5.44 | −7.1 |

-continued

NUMERICAL EXAMPLE 2
UNIT: mm

| | | | | | |
|---|---|---|---|---|---|
| 4 | 33 | ∞ | 0 | 0 | 0 |
| 5 | 34 | 132.74 | 3.92 | −1.4 | −3.81 |
| 6 | 36 | 67.92 | 15.42 | 4.2 | −6.14 |
| 7 | 41 | −324.09 | 27.52 | 54.53 | 31.47 |
| 8 | 49 | 349.76 | 26.65 | 47.6 | 31.57 |

Single Lens Data

| Lens | Starting Surface | Focal Length: |
|---|---|---|
| 1 | 1 | −191.12 |
| 2 | 3 | −112.32 |
| 3 | 5 | 116.94 |
| 4 | 7 | 294.55 |
| 5 | 9 | −78.58 |
| 6 | 11 | −94.29 |
| 7 | 13 | 178.02 |
| 8 | 15 | 156.29 |
| 9 | 17 | −82.67 |
| 10 | 18 | 114.85 |
| 11 | 20 | 317.54 |
| 12 | 22 | 111.22 |
| 13 | 24 | 180.05 |
| 14 | 26 | −43.01 |
| 15 | 28 | −45.51 |
| 16 | 29 | 36.58 |
| 17 | 31 | −54.83 |
| 18 | 34 | 132.74 |
| 19 | 36 | 122.4 |
| 20 | 38 | −116.49 |
| 21 | 39 | 65.03 |
| 22 | 41 | 46.02 |
| 23 | 42 | −27.18 |
| 24 | 44 | 48.84 |
| 25 | 46 | 53.75 |
| 26 | 47 | −31.89 |
| 27 | 49 | 33.64 |
| 28 | 51 | −26.24 |
| 29 | 53 | −30.24 |
| 30 | 55 | 28.41 |

NUMERICAL EXAMPLE 3
UNIT: mm

Surface Data

| Surface No. | r | d | nd | vd | Effective Diameter |
|---|---|---|---|---|---|
| 1 | 106.083 | 22.00 | 1.49171 | 57.4 | 160.00 |
| 2 | 99.866 | 39.72 | 1.00000 | 0.0 | 130.00 |
| 3 | −163.549 | 5.20 | 2.00272 | 19.3 | 115.00 |
| 4 | −3113.913 | 0.10 | 1.00000 | 0.0 | 110.00 |
| 5 | 472.175 | 14.41 | 1.49700 | 81.5 | 110.00 |
| 6 | −213.372 | 0.15 | 1.00000 | 0.0 | 110.00 |
| 7 | 602.510 | 8.66 | 1.94594 | 18.0 | 100.00 |
| 8 | −306.000 | (Variable) | 1.00000 | 0.0 | 100.00 |
| 9* | 134.239 | 3.20 | 1.77250 | 49.6 | 80.53 |
| 10 | 41.501 | 23.47 | 1.00000 | 0.0 | 64.82 |
| 11 | −83.617 | 2.70 | 1.77250 | 49.6 | 63.76 |
| 12 | 595.315 | 4.92 | 1.00000 | 0.0 | 63.99 |
| 13 | 124.540 | 4.85 | 1.89286 | 20.4 | 65.04 |
| 14 | 542.396 | 2.01 | 1.00000 | 0.0 | 64.75 |
| 15 | 891.609 | 7.62 | 1.59522 | 67.7 | 64.34 |
| 16 | −103.942 | 7.03 | 1.00000 | 0.0 | 63.97 |
| 17 | 1089.788 | 2.10 | 1.85478 | 24.8 | 57.74 |
| 18 | 66.895 | 9.54 | 1.49700 | 81.5 | 58.62 |
| 19 | −378.166 | 0.20 | 1.00000 | 0.0 | 59.25 |
| 20 | 210.995 | 4.45 | 1.49700 | 81.5 | 61.08 |
| 21 | −629.084 | 0.20 | 1.00000 | 0.0 | 61.42 |
| 22 | 145.928 | 9.06 | 1.59522 | 67.7 | 62.72 |
| 23 | −119.124 | 0.20 | 1.00000 | 0.0 | 62.74 |
| 24 | 66.144 | 4.45 | 1.76385 | 48.5 | 59.20 |
| 25 | 123.151 | (Variable) | 1.00000 | 0.0 | 58.61 |

NUMERICAL EXAMPLE 3
UNIT: mm

| | | | | | |
|---|---|---|---|---|---|
| 26* | 214.375 | 1.40 | 1.88300 | 40.8 | 32.43 |
| 27 | 32.320 | 5.32 | 1.00000 | 0.0 | 30.47 |
| 28 | −136.253 | 1.20 | 1.59522 | 67.7 | 30.55 |
| 29 | 34.069 | 5.54 | 1.85478 | 24.8 | 31.48 |
| 30 | −397.458 | 3.46 | 1.00000 | 0.0 | 31.46 |
| 31 | −49.569 | 1.20 | 1.76385 | 48.5 | 31.34 |
| 32 | 281.941 | (Variable) | 1.00000 | 0.0 | 32.32 |
| 33(Diaphragm) | ∞ | (Variable) | 1.00000 | 0.0 | |
| 34 | 51.039 | 3.92 | 1.59522 | 67.7 | 36.51 |
| 35* | 139.136 | (Variable) | 1.00000 | 0.0 | 36.50 |
| 36 | 108.640 | 5.45 | 1.49700 | 81.5 | 41.11 |
| 37 | −136.833 | 0.20 | 1.00000 | 0.0 | 41.18 |
| 38 | 79.210 | 1.66 | 2.00100 | 29.1 | 40.75 |
| 39 | 46.824 | 8.11 | 1.49700 | 81.5 | 39.68 |
| 40 | −99.285 | (Variable) | 1.00000 | 0.0 | 39.49 |
| 41 | 60.126 | 5.87 | 1.95906 | 17.5 | 34.25 |
| 42 | −166.195 | 1.66 | 2.00069 | 25.5 | 33.36 |
| 43 | 33.049 | 2.95 | 1.00000 | 0.0 | 31.18 |
| 44 | 33.456 | 7.69 | 1.48749 | 70.2 | 32.49 |
| 45 | −77.237 | 0.20 | 1.00000 | 0.0 | 32.29 |
| 46 | 92.545 | 7.28 | 1.49700 | 81.5 | 31.04 |
| 47 | −36.721 | 1.87 | 1.95375 | 32.3 | 30.01 |
| 48 | 189.601 | (Variable) | 1.00000 | 0.0 | 29.68 |
| 49 | 364.682 | 8.00 | 2.00069 | 25.5 | 30.00 |
| 50 | −51.072 | 1.87 | 1.78590 | 44.2 | 30.00 |
| 51 | 526.197 | 8.82 | 1.00000 | 0.0 | 31.00 |
| 52 | −46.016 | 1.66 | 2.00069 | 25.5 | 31.00 |
| 53 | 98.763 | 9.00 | 1.65160 | 58.5 | 32.00 |
| 54 | −43.530 | (Variable) | 1.00000 | 0.0 | 32.00 |
| Image Plane | ∞ | | | | |

Aspheric Data

9th Surface

K = 3.48651E+00 A4 = 1.59139E−07 A6 = 1.90332E−11 A8 = −4.47085E−14

26th Surface

K = 0.00000E+00 A4 = 3.24271E−07 A6 = −2.92296E−11 A8 = −8.99730E−13

35th Surface

K = 0.00000E+00 A4 = 3.14085E−06 A6 = 1.30590E−10 A8 = −2.00080E−13

Various Data
ZOOM RATIO 7.04

| | WIDE-ANGLE | MIDDLE | TELEPHOTO |
|---|---|---|---|
| Focal Length: | 14.98 | 44.10 | 105.46 |
| FNO | 2.80 | 2.83 | 3.92 |
| Half Angle of View (°): | 46.07 | 19.42 | 8.39 |
| Image Height | 15.55 | 15.55 | 15.55 |
| Overall lens length | 402.64 | 402.62 | 402.27 |
| BF | 17.81 | 17.94 | 17.60 |
| d8 | 2.00 | 2.00 | 2.00 |
| d25 | 1.17 | 31.16 | 41.24 |
| d32 | 41.84 | 11.85 | 1.77 |
| d33 | 13.02 | 13.42 | 1.89 |
| d35 | 40.21 | 22.33 | 4.82 |
| d40 | 13.01 | 30.34 | 59.38 |
| d48 | 3.00 | 3.00 | 3.00 |
| d54 | 17.81 | 17.94 | 17.60 |
| Entrance Pupil Position | 127.41 | 146.59 | 154.78 |
| Exit Pupil Position | −145.96 | −99.22 | −77.97 |
| Front Principal Point Position | 145.57 | 183.29 | 140.21 |
| Rear Principal Point Position | 2.83 | −26.16 | −87.86 |

Zoom Lens Unit Data

| Lens Unit | Starting Surface | Focal Length: | Lens Configuration Length | Front Principal Point Position | Rear Principal Point Position |
|---|---|---|---|---|---|
| 1 | 1 | 43766.19 | 90.24 | 11342.91 | 10450.69 |
| 2 | 9 | 53.02 | 86.00 | 58.93 | 39.16 |
| 3 | 26 | −25.25 | 18.12 | 5.44 | −7.10 |
| 4 | 33 | ∞ | 0.00 | 0.00 | 0.00 |

-continued

NUMERICAL EXAMPLE 3
UNIT: mm

| 5 | 34 | 132.74 | 3.92 | −1.40 | −3.81 |
| 6 | 36 | 67.92 | 15.42 | 4.20 | −6.14 |
| 7 | 41 | −324.09 | 27.52 | 54.53 | 31.47 |
| 8 | 49 | −381.70 | 29.35 | 4.87 | −17.04 |

Single Lens Data

| Lens | Starting Surface | Focal Length: |
| --- | --- | --- |
| 1 | 1 | −300.01 |
| 2 | 3 | −170.23 |
| 3 | 5 | 296.91 |
| 4 | 7 | 212.77 |
| 5 | 9 | −78.58 |
| 6 | 11 | −94.29 |
| 7 | 13 | 178.02 |
| 8 | 15 | 156.29 |
| 9 | 17 | −82.67 |
| 10 | 18 | 114.85 |
| 11 | 20 | 317.54 |
| 12 | 22 | 111.22 |
| 13 | 24 | 180.05 |
| 14 | 26 | −43.01 |
| 15 | 28 | −45.51 |
| 16 | 29 | 36.58 |
| 17 | 31 | −54.83 |
| 18 | 34 | 132.74 |
| 19 | 36 | 122.4 |
| 20 | 38 | −116.49 |
| 21 | 39 | 65.03 |
| 22 | 41 | 46.02 |
| 23 | 42 | −27.18 |
| 24 | 44 | 48.84 |
| 25 | 46 | 53.75 |
| 26 | 47 | −31.89 |
| 27 | 49 | 44.79 |
| 28 | 50 | −58.83 |
| 29 | 52 | −30.9 |
| 30 | 53 | 47.36 |

Table 1 below summarizes various values of each numerical example.

TABLE 1

|  | Numerical Ex. 1 | Numerical Ex. 2 | Numerical Ex. 3 |
| --- | --- | --- | --- |
| Skcw | 45.8 | 50.3 | 52.7 |
| Skmw | 38.9 | 40.0 | 40.0 |
| Ffc | 584.2 | 287.5 | 363.4 |
| Fn | −366.8 | −112.3 | −170.2 |
| Fd | −137.6 | −191.1 | −300.0 |
| ESw | 0.48 | −0.084 | −0.094 |
| ESa | 0.49 | −0.078 | −0.078 |
| Dd | 20 | 17 | 22 |
| Dfc | 3.2 | 5.4 | 5.2 |
| Frc | −489.8 | 349.8 | −381.7 |
| Cond. Expression (1) | 1.15 | 1.26 | 1.32 |
| Cond. Expression (2) | 1.59 | 2.56 | 2.13 |
| Cond. Expression (3) | 0.24 | 0.66 | 0.83 |
| Cond. Expression (4) | 1.00 | 1.10 | 1.19 |
| Cond. Expression (5) | 6.25 | 3.15 | 4.23 |
| Cond. Expression (6) | 1.19 | 0.82 | 0.95 |

Image Pickup Apparatus

Figure 7:
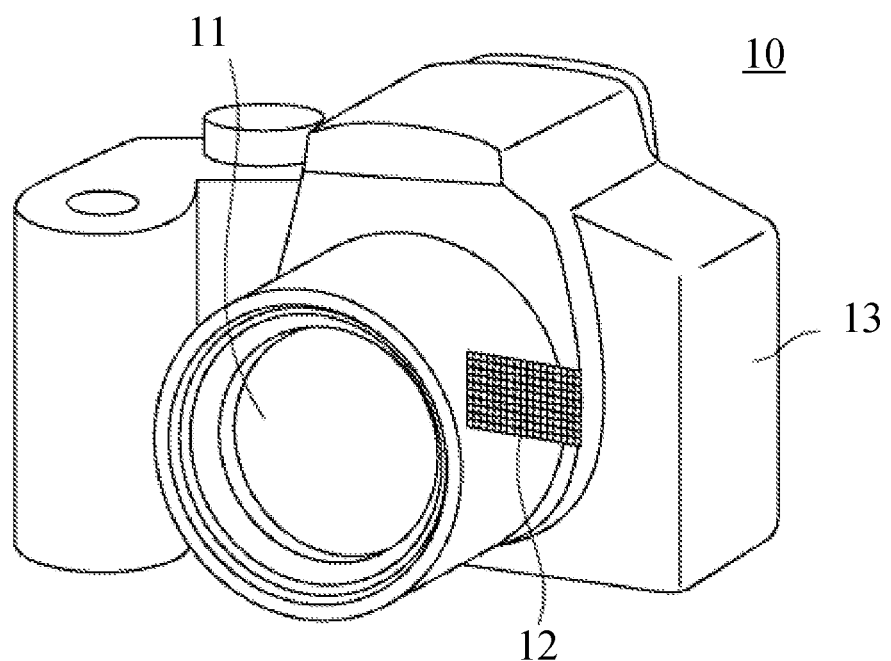
FIG. 7 is a schematic view of an image pickup apparatus.

Referring now to FIG. 7, a description will be given of an example of a digital still camera (image pickup apparatus) using the optical system L0 according to this disclosure as an imaging optical system. In FIG. 7, reference numeral 10 denotes a camera body, and reference numeral 11 denotes an imaging optical system that includes any of the optical systems L0 described in Examples 1 to 3. Reference numeral 12 denotes a solid-state image sensor (photoelectric conversion element) such as a CCD sensor or a CMOS sensor, which is built in the camera body 10 and configured to receive an optical image formed by the imaging optical system 11 and to perform photoelectric conversion. The camera body 10 may be a so-called single-lens reflex camera having a quick turn mirror, or a so-called mirrorless (non-reflex) camera having no quick turn mirror.

Thus applying the optical system L0 of this disclosure to an image pickup apparatus such as a digital still camera can provide an image pickup apparatus having high optical performance even in water.

Image Pickup System

Another aspect of the disclosure is an image pickup system (surveillance camera system) that includes the optical system L0 according to each example and a control unit configured to control the optical system L0. In this case, the control unit can control the optical system L0 so that each lens unit is moved as described above during zooming, focusing, and image stabilization. At this time, the control unit does not have to be integrated with the optical system L0 and may be separate from the optical system L0. For example, a control unit (control apparatus) distant from a driving unit that drives each lens of the optical system L0 may include a transmission unit that transmits a control signal (command) for controlling the optical system L0. This control unit can remotely control the optical system L0.

An operation unit such as a controller or a button for remotely controlling the optical system L0 provided to the control unit may enable the optical system L0 to be controlled in response to an input to the user's operation unit. For example, in a case where a magnifying button and a reduction button are provided as an operation unit, a signal may be sent from the control unit to the driving unit of the optical system L0 so that a magnification of the optical system L0 is increased when the magnifying button is pressed and the magnification of the optical system L0 is decreased when the reduction button of the optical system L0 is pressed.

The image pickup system may include a display unit such as a liquid crystal panel that displays information (moving state) on zoom of the optical system L0. The information on the zoom of the optical system L0 is, for example, a zoom magnification (zoom state) and a moving amount (moving state) of each lens unit. In this case, the user can remotely control the optical system L0 via the operation unit while viewing the information on the zoom of the optical system L0 displayed on the display unit. The display unit and the operation unit may be integrated by adopting, for example, a touch panel or the like.

Each of the above examples can provide an attachment optical system, an optical system, an image pickup apparatus, an image pickup system, and a method for manufacturing an optical system, each of which can provide optical performance for use in water close to that for use in air.

While the disclosure has been described with reference to exemplary examples, it is to be understood that the disclosure is not limited to the disclosed exemplary examples. The scope of the following claims is to be accorded the broadest interpretation so as to encompass all such modifications and equivalent structures and functions.

This application claims the benefit of Japanese Patent Application No. 2021-133339, filed on Aug. 18, 2021, which is hereby incorporated by reference herein in its entirety.

What is claimed is:

1. An attachment optical system attachable to and detachable from an imaging optical system, the attachment optical system comprising:
a first converter optical system attachable to an object side of the imaging optical system; and
a second converter optical system attachable to an image side of the imaging optical system,
wherein the first converter optical system includes a first unit consisting of a dome-shaped cover, and
wherein the following inequality is satisfied:

$$0.9 < |skcw/skmw| < 1.5$$

where skcw is a distance on an optical axis from a lens surface closest to an image plane of the imaging optical system to the image plane while the attachment optical system is attached to the imaging optical system in water, and skmw is a distance on the optical axis from the lens surface closest to the image plane of the imaging optical system to the image plane while the attachment optical system is not attached to the imaging optical system in air.

2. The attachment optical system according to claim 1, wherein the first converter optical system includes a second unit consisting of a plurality of lenses disposed on the image side of the first unit.

3. The attachment optical system according to claim 2, wherein the second unit includes a negative lens, and wherein the following inequalities are satisfied:

$$1.5 < |f\!fc/fn| < 3.0$$

$$0.1 < |fd/f\!fc| < 1.0$$

where ffc is a focal length of the second unit, fn is a focal length of the negative lens, and fd is a focal length of the first unit in water.

4. The attachment optical system according to claim 2, wherein the following inequality is satisfied:

$$3 < |dd/dfc| < 9$$

where dd is a distance on the optical axis from a lens surface on the object side of the first unit to a lens surface on the image side of the first unit, and dfc is a distance on the optical axis from a lens surface on the object side of a concave lens disposed adjacent to the first unit of the second unit to a lens surface on the image side of the concave lens of the second unit.

5. The attachment optical system according to claim 2, wherein the following inequality is satisfied:

$$0.8 < |f\!fc/frc| < 1.5$$

where ffc is a focal length of the second unit, and frc is a focal length of the second converter optical system.

6. An optical system comprising:
an imaging optical system; and
an attachment optical system attachable to and detachable from the imaging optical system,
wherein the attachment optical system includes:
a first converter optical system attachable to an object side of the imaging optical system; and
a second converter optical system attachable to an image side of the imaging optical system,
wherein the first converter optical system includes a first unit consisting of a dome-shaped cover, and
wherein the following inequality is satisfied:

$$0.9 < |skcw/skmw| < 1.5$$

where skcw is a distance on an optical axis from a lens surface closest to an image plane of the imaging optical system to the image plane while the attachment optical system is attached to the imaging optical system in water, and skmw is a distance on the optical axis from the lens surface closest to the image plane of the imaging optical system to the image plane while the attachment optical system is not attached to the imaging optical system in air.

7. The optical system according to claim 6, wherein the following inequality is satisfied:

$$1.0 \leq |ESw/ESa| < 1.2$$

where ESw is a focus sensitivity at a wide-angle end of the imaging optical system while the attachment optical system is attached to the imaging optical system in water, and ESa is a focus sensitivity at the wide-angle end of the imaging optical system while the attachment optical system is not attached to the imaging optical system in air.

8. An image pickup apparatus comprising:
the optical system according to claim 6; and
an image sensor configured to receive an image formed by the optical system.

9. An image pickup system comprising:
the optical system according to claim 6; and
a control unit configured to control the optical system during zooming.

10. The image pickup system according to claim 9, wherein the control unit includes a transmission unit separate from the optical system and configured to transmit a control signal for controlling the optical system.

11. The image pickup system according to claim 9, wherein the control unit includes an operation unit separate from the optical system and configured to operate the optical system.

12. The image pickup system according to claim 9, further comprising a display unit configured to display information on zoom of the optical system.

* * * * *